US007716707B2

(12) United States Patent
de Heer

(10) Patent No.: US 7,716,707 B2
(45) Date of Patent: May 11, 2010

(54) IN-PROGRAM CONTENT TELESCOPING

(75) Inventor: David L. de Heer, Woodside, CA (US)

(73) Assignee: Microsoft Corporation, Redmond, WA (US)

( * ) Notice: Subject to any disclaimer, the term of this patent is extended or adjusted under 35 U.S.C. 154(b) by 813 days.

(21) Appl. No.: 11/256,049

(22) Filed: Oct. 21, 2005

(65) Prior Publication Data

US 2007/0094692 A1    Apr. 26, 2007

(51) Int. Cl.
   *H04N 7/173* (2006.01)
(52) U.S. Cl. .............................. 725/87; 725/88; 725/102
(58) Field of Classification Search ............. 725/87–88, 725/102, 109, 110, 112, 113, 136, 32, 40–42, 725/51
   See application file for complete search history.

(56) References Cited

U.S. PATENT DOCUMENTS

| | | | | | |
|---|---|---|---|---|---|
| 5,961,603 | A | * | 10/1999 | Kunkel et al. | 709/229 |
| 6,108,706 | A | * | 8/2000 | Birdwell et al. | 709/229 |
| 6,263,505 | B1 | * | 7/2001 | Walker et al. | 725/110 |
| 6,483,986 | B1 | * | 11/2002 | Krapf | 386/68 |
| 6,557,172 | B1 | * | 4/2003 | Carr | 725/139 |
| 6,637,032 | B1 | * | 10/2003 | Feinleib | 725/110 |
| 7,559,073 | B2 | * | 7/2009 | Marler et al. | 725/50 |
| 2002/0147984 | A1 | * | 10/2002 | Tomsen et al. | 725/109 |
| 2002/0162115 | A1 | * | 10/2002 | Bruckner et al. | 725/105 |
| 2004/0022278 | A1 | * | 2/2004 | Thomas et al. | 370/537 |
| 2004/0034875 | A1 | * | 2/2004 | Bulkowski et al. | 725/136 |
| 2004/0261127 | A1 | * | 12/2004 | Freeman et al. | 725/135 |
| 2005/0015817 | A1 | * | 1/2005 | Estipona | 725/136 |
| 2005/0228806 | A1 | * | 10/2005 | Haberman | 707/100 |
| 2006/0031914 | A1 | * | 2/2006 | Dakss et al. | 725/135 |
| 2007/0186228 | A1 | * | 8/2007 | Ramaswamy et al. | 725/14 |

* cited by examiner

*Primary Examiner*—Scott Beliveau
*Assistant Examiner*—Alexander Q Huerta
(74) *Attorney, Agent, or Firm*—Lee & Hayes, PLLC

(57) ABSTRACT

In-program content telescoping can enable a subscriber to telescope into content that is specially associated with a broadcast program. The selectable content is stored as video-on-demand (VOD) assets that are related to particular portions of broadcast programs. In a described implementation, content providers created association linkages between broadcast programs and the VOD assets. Each association links a VOD asset to a broadcast program and a specific trigger location within the associated broadcast program. The association linkage may be include in VOD asset metadata and in trigger information. In a described operation, a client device detects trigger information in a media transport stream. In response to a request, the client receives asset representation indicators for the VOD assets that are associated with the upcoming trigger location. Upon arrival of the trigger location in the media transport stream, the client displays the asset representation indicators for consideration by the subscriber.

16 Claims, 11 Drawing Sheets

IN-PROGRAM CONTENT TELESCOPING

BACKGROUND

Standard television viewing has been a staple of home entertainment for many decades. With standard television viewing, a user tunes into a broadcast program and views the program content at the scheduled broadcast time. For about the last decade; however, advanced television services such as interactive television and video-on-demand (VOD) television have been predicted to become commonplace. Unfortunately, the reality of available television services has thus far fallen well below the capabilities that have been forecasted.

Of the many predicted advanced televisions services, on-demand television is starting to be offered, at least in accordance with relatively simplistic paradigms. For example, recently-released movies along with a limited assortment of other programming content can be selectively accessed on an individualized content basis. Interactive television, on the other hand, remains largely an unrealized dream. Television users can, for instance, request that specific news and weather information be presented on their television screens. In short, the passive viewing of traditional broadcast programs remains the primary form of television entertainment.

SUMMARY

In-program content telescoping can enable a subscriber to telescope into content that is specially associated with a broadcast program. The selectable content is stored as video-on-demand (VOD) assets that are related to particular portions of broadcast programs. In a described implementation, content providers create association linkages between broadcast programs and the VOD assets. Each association links a VOD asset to a broadcast program and a specific trigger location within the associated broadcast program. The association linkage may be included in VOD asset metadata and in trigger information. In a described operation, a client device detects trigger information in a media transport stream. In response to a request from the client to a network operator, the client receives asset representation indicators for the VOD assets that are associated with the upcoming trigger location. Upon arrival of the trigger location in the media transport stream, the client displays the asset representation indicators for consideration by the subscriber.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

INTRODUCTION

Figure 1:
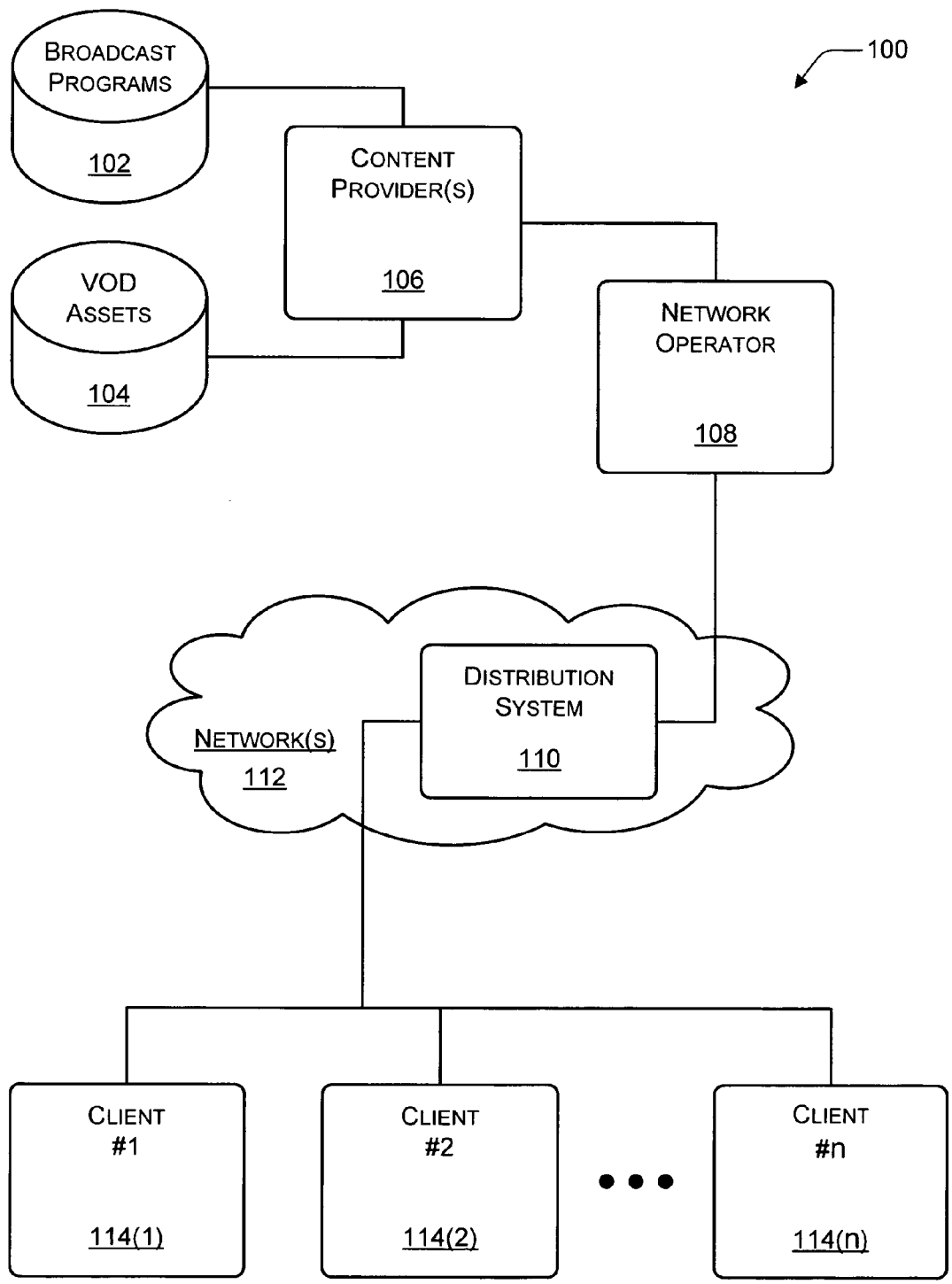
FIG. 1 is a block diagram illustrating a general example environment in which in-program content telescoping may be implemented.

In this world of ever-increasing multi-tasking, adding stickiness to television content is an ever-increasing goal for television content providers. Content providers need to make their content more and more relevant to their target audience in order merely to maintain their current share of the entertainment focus of the public. In other words, they need to run faster and faster just to stay in the same place from a ratings perspective.

Certain implementations of in-program content telescoping can increase stickiness by providing individualized, narrowly-focused content that is relevant to individual television viewers within the context of the broadcast experience. Moreover, this individualized, narrowly-focused content may be provided in a manner that is cost-effective to the content provider and financially rewarding to network operators.

Content providers have hundreds of thousands of hours of content "in the can" that is being underutilized. This content is not valueless; it merely lacks relevancy to a sufficiently large audience to be worth re-broadcasting to the general television viewing public. Previously, the technology did not exist to make use of these assets in any reasonable or profitable way.

In a described implementation, in-program content telescoping can increase stickiness and leverage existing assets as follows. Initially, a content provider creates a VOD library of interesting content clips that are capable of providing additional value to broadcast program content. Next, in either an automated or a manual fashion, the content provider adds trigger points that allow a subscriber to pause the broadcast program stream and "telescope" into that part of the program by playing at least one of the VOD library clips. Finally, after the subscriber has completed a playing of the selected clip, the broadcast program stream is un-paused and the playing thereof continues.

One example scenario for in-program content telescoping is provided by way of a home remodeling show that has a kitchen remodeling episode. In this episode, a refrigerator is being replaced. After a description of the new refrigerator's attributes or after installation of the new refrigerator, a prompt can be presented asking the subscriber if they are interested in viewing more clip segments of previous episodes that involve the upgrading of a refrigerator. If the subscriber is interested, the subscriber can activate the prompt to launch a VOD clip or clips of other refrigerator examples. Alternatively, the VOD clips can be directed to advertisements for one or more refrigerators.

Another, more sophisticated, example scenario involves a mosaic application in which the main window plays the broadcast program episode of the remodeling show in which a kitchen is being remodeled. To the left of the main window, four picture-in-picture (PIP)-sized windows each display a still of a related VOD clip. For example, four different refrigerators from four different previous kitchen-oriented episodes may be displayed in the stills. Also, the stills might include one each of a sink, a refrigerator, a faucet, and kitchen cabinets. By navigating to and clicking on one of the PIP-type stills, the subscriber causes the live broadcast program stream to pause and the appropriate VOD session to be launched.

Other examples include, but are not limited to, the following. A broadcast of a baseball game may display the last four at-bats for a player that is to bat next. Selecting one of the at-bat clips enables a subscriber to review the player's recent success or failures at the plate. News shows may provide links to previous stories on a given subject or the opportunity to view an in-depth version of a current story.

An example business model that can support in-program content telescoping is as follows. Television networks can pay network operators (for off-air networks) or discount their rates (for pay networks) to carry and deliver telescoped content. The television networks can then increase their revenues by charging more to advertisers based on increased ratings. Additionally, the television networks can bundle precursor ads with their telescoped content and charge a premium to the advertisers for the service of delivering such highly-targeted commercials to highly-interested requesting subscribers.

In a described implementation, four major entities and aspects may be involved with in-program content telescoping. These four major entities and aspects are: (i) content providers, (ii) an asset management system, (iii) clients, and (iv) a reporting system. The asset management and reporting systems are run primarily by a network operator (NetOp). Introductory examples of these entities and aspects are provided below.

Content providers create relatively small VOD clips from interesting, existing content. They create metadata corresponding to these clips; the metadata includes the broadcast program ID(s) to which the VOD clips can be associated. The metadata also includes (i) asset presentation information (e.g., prompt format or PIP stills) and (ii) associated broadcast program location data (e.g., keywords in the closed captioning (CC) stream that can link the clip to the broadcast or random access points (RAPs) in the broadcast program stream when/where the content telescoping indicator(s) are to appear). The VOD asset metadata can further include reporting metadata that can be returned to the network operator and/or to the content provider when the VOD asset is played.

The content provider delivers the clips and metadata to the network operator's telescope asset management system. The asset management system ingests the clips, distributes them to the appropriate long-tailed VOD server for storage, and prunes the clips out of the VOD servers when the VOD assets expire. The pruning can be based, for example, on the broadcast program scheduling information. The broadcast schedule is usually contained in a program guide database that is used for delivery of an electronic program guide (EPG) to client devices. The asset management system can access the broadcast schedule by querying the guide database using the broadcast program ID encapsulated in the VOD asset's metadata.

The asset management system then schedules a content association subsystem to launch when the broadcast program is being transmitted. The content association subsystem monitors the broadcast program stream for CC keywords or RAP points defined in the VOD asset metadata. When the content association subsystem detects a CC keyword or RAP point of interest, it inserts trigger information (e.g., a trigger and trigger metadata) into the broadcast program stream. The more extensive that the trigger metadata is, the more it can impact the real-time nature of the broadcast program stream. Nevertheless, the trigger metadata may include not only the clip IDs (in some format) as well as the time in the stream at which the prompt or stills should be displayed, but also a prompt definition, possibly PIP stills, and so forth.

When a client device that is tuned to the broadcast program stream detects a trigger, it determines the type of content telescoping trigger (either prompt or PIP still), collects the clip metadata (e.g., by contacting the network VOD transmission system), and presents the appropriate UI to the subscriber at the predefined time. If the subscriber invokes the content telescope through the UI, the client device pauses the broadcast program content by, for example, making use of integrated DVR functionality. The client device also launches the VOD clip by making use of available VOD player functionality. The client device detects when either the VOD clip finishes or the subscriber stops the VOD, and the client device then un-pauses the live broadcast program stream.

With regard to reporting aspects, when a client device renders a telescoped content segment, it notes the time, VOD asset ID, and/or broadcast program ID. The noted time and broadcast program ID information are sent to a reporting server of the network operator. The reporting server aggregates all programs and times and provides the network operator with a periodic report of the telescoped content that has been delivered and displayed.

GENERAL EXAMPLE ENVIRONMENT FOR
IN-PROGRAM CONTENT TELESCOPING

FIG. 1 is a block diagram illustrating a general example environment 100 in which in-program content telescoping may be implemented. As illustrated, example environment 100 includes one or more content providers 106, a network operator 108, a distribution system 110, and multiple clients 114. Generally, content is provided to network operator 108 from content providers 106. Network operator 108 disseminates the content to the multiple clients 114 over a distribution system 110 via one or more networks 112. Specifically, "n" clients #1 114(1), client #2 114(2) . . . client #n 114(n) are shown in environment 100.

In a described implementation, environment 100 includes two types of content: broadcast programs 102 and VOD assets 104. These two types of content are provided to a network operator 108 by one or more content providers 106. The content may be provided "live" or days to weeks in advance of the scheduled broadcast time.

Content providers 106 may be television networks, premium networks, so-called basic cable or satellite networks, a local and/or independent content provider, and so forth. Network operator 108 may be a cable network operator, a telephone network operator, and so forth. Accordingly, network operator 108 utilizes distribution system 110 to distribute content 102/104 to clients 114 over one or more networks 112.

Distribution system 110 may include many different types of distribution system infrastructure. Examples include, but are not limited to, a network head-end, a server device, a storage device, a VOD system, network nodes (e.g., routers, switches, etc.), communication linkages there between, some combination thereof, and so forth. Networks 112 may be comprised of one or more of: a cable network, a satellite network, a telephone network, an internet or a backbone thereof, a telephone network, a digital subscriber line (DSL) network, an intranet, some combination thereof, and so forth.

In a described implementation, clients 114 are capable of two-way communication with network operator 108 over distribution system 110 via one or more networks 112. (The communications may be effectuated over two different communication channel types.) For example, clients 114 usually receive EPG data, television content, client device software and firmware updates, etc. from network operator 108. Clients 114 usually send pay-per-view requests, VOD requests, etc. to network operator 108. By way of example only, a client 114 may be a device comprising a computer, a set-top box (e.g., cable, satellite, or telephone-based) device, a wireless device (e.g., a mobile phone or a personal digital assistant (PDA)), a gaming device, a digital or intelligent television, some combination thereof, and so forth. Client devices 114 may include a separate or an integrated screen or other display device.

Figure 2:
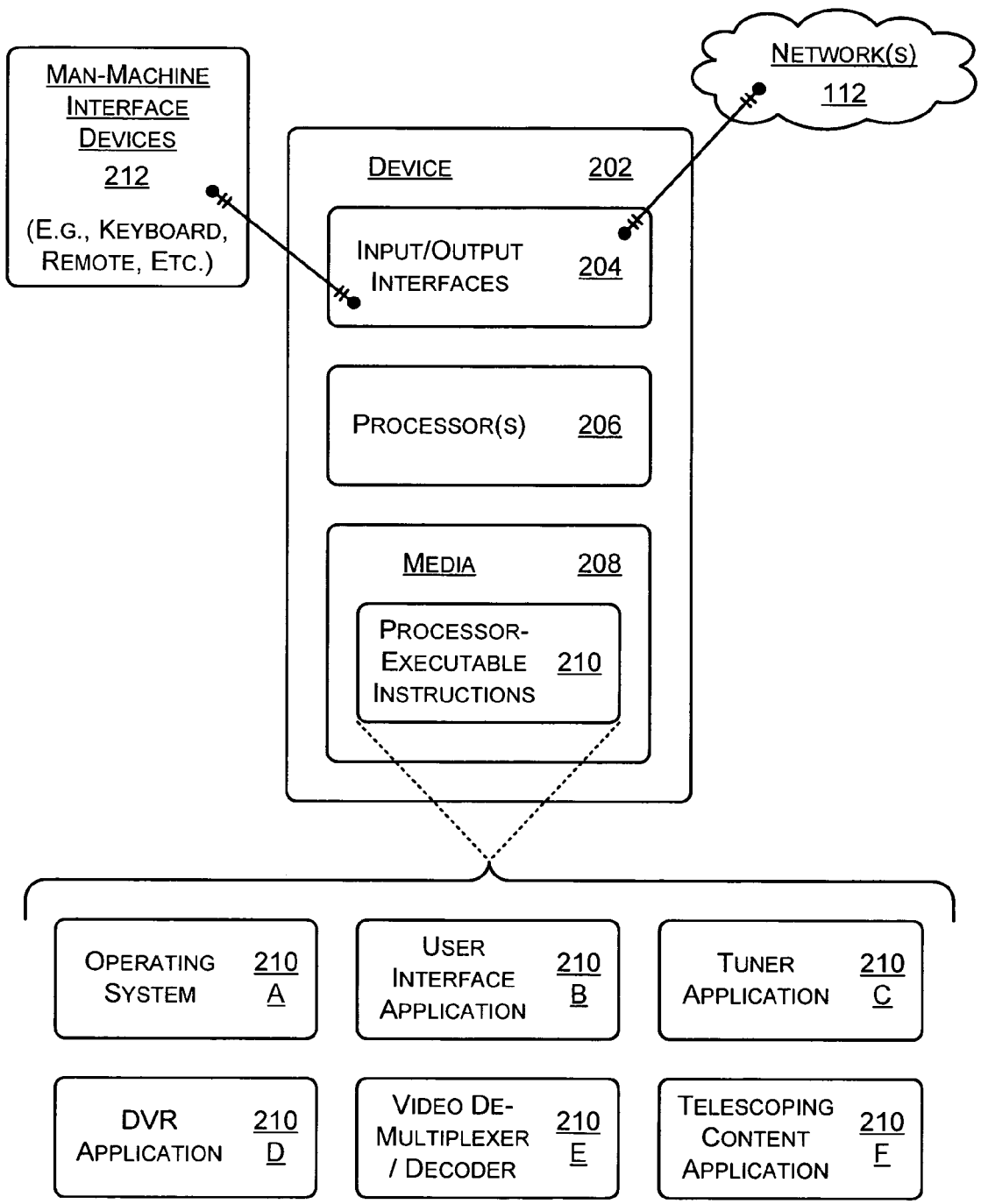
FIG. 2 is an example device that may be employed within the general environment of FIG. 1.

FIG. 2 is an example device 202 that may be employed within the general environment 100 of FIG. 1. For example, device 200 may be an example of a client device 114 or any part of network operator 108 and the distribution system 110 thereof. For instance, device 202 may represent a server device, a storage device, a transmission device or link, a network node, a head-end, a mini head-end, some combination thereof, and so forth. As illustrated, device 202 includes one or more input/output (I/O) interfaces 204, at least one processor 206, and one or more media 208. Although not specifically illustrated, device 202 may also include other components (e.g., a DVR for a client device).

In a described client 114 implementation of device 202, I/O interfaces 204 include (i) a network interface for communicating with network operator 108 (of FIG. 1) via network 112, (ii) a display device interface for displaying content and a UI on a display screen, and (iii) man-machine interfaces. Examples of network interfaces include a network card, a modem, one or more ports, and so forth. Examples of a display device interfaces include a graphics driver, a graphics card, a hardware or software driver for a screen or monitor, and so forth. Examples of man-machine interfaces include those that communicate by wire or wirelessly to man-machine interface devices 212 (e.g., a remote control, a keyboard, a mouse or other pointing device, etc.).

Generally, processor 206 is capable of executing, performing, and/or otherwise effectuating processor-executable instructions, such as processor-executable instructions 210. Media 208 is comprised of one or more processor-accessible media. In other words, media 208 may include processor-executable instructions 210 that are executable by processor 206 to effectuate the performance of functions by device 202.

Thus, realizations for in-program content telescoping may be described in the general context of processor-executable instructions. Generally, processor-executable instructions include routines, programs, coding, modules, protocols, objects, interfaces, components, metadata and definitions thereof, data structures, etc. that perform and/or enable particular tasks and/or implement particular abstract data types. Processor-executable instructions may be located in separate storage media, executed by different processors, and/or propagated over or extant on various transmission media.

Processor(s) 206 may be implemented using any applicable processing-capable technology. Media 208 may be any available media that is included as part of and/or accessible by device 202. It includes volatile and non-volatile media, removable and non-removable media, and storage and transmission media (e.g., wireless or wired communication channels). For a network-side implementation of device 202, media 208 may include an array of disks for mass storage of content (e.g., broadcast programs 102 and/or VOD assets 104) and random access memory (RAM) for storing instructions that are currently being executed. Similarly, for a client 114 implementation of device 202, media 208 may include a disk drive (e.g., for providing DVR functionality) and RAM for storing instructions that are currently being executed. In either case, processor-executable instructions may also be stored on nonvolatile memory such as disk drives and/or flash memory.

As illustrated, media 208 comprises at least processor-executable instructions 210. Generally, processor-executable instructions 210, when executed by processor 206, enable device 202 to perform the various functions described herein, including those actions of flow diagrams 1000 and 1100 of FIG. 10 and 11, respectively. For example, a telescoping content application for a client device may perform the actions of flow diagram 1000, and a telescoping content application for a network-side device may perform the actions of flow diagram 1100. More specifically, processor-executable instructions 210 (especially for a client device implementation) may include an operating system 210A, a user interface application 210B, a tuner application 210C; a DVR application 210D, a video de-multiplexer and decoder 210E, a telescoping content application 210F.

Operating system 210A provides a foundation for other applications to run on a device, and it can facilitate interactions between applications and other applications as well as with the underlying hardware. User interface application 210B is capable of presenting a user interface (e.g., a graphical user interface (GUI)) on a display device. An example GUI for in-program content telescoping is described below with particular reference to FIG. 9. Tuner application 210C enables a device to tune to different television channels. Tuner application 210C, like processor-executable instructions 210 in general, may utilize dedicated hardware to effectuate its functions.

DVR application 210D enables video content to be recorded, paused, played, and so forth. DVR application 210D may operate in conjunction with one or more tuner applications 210C and/or hardware tuning components as well as a disk drive or similar storage device. Video de-multiplexer/decoder 210E is adapted to de-multiplex and then decode an incoming media data stream. After decoding, frames can be presented on a video screen to a subscriber/user. Telescoping content application 210F is capable of performing at least a subset of the in-program content telescoping features and functions described herein, such as the actions described below with particular reference to the flow diagram of FIG. 10.

EXAMPLE GENERAL PRINCIPLES FOR IN-PROGRAM CONTENT TELESCOPING

Figure 3:
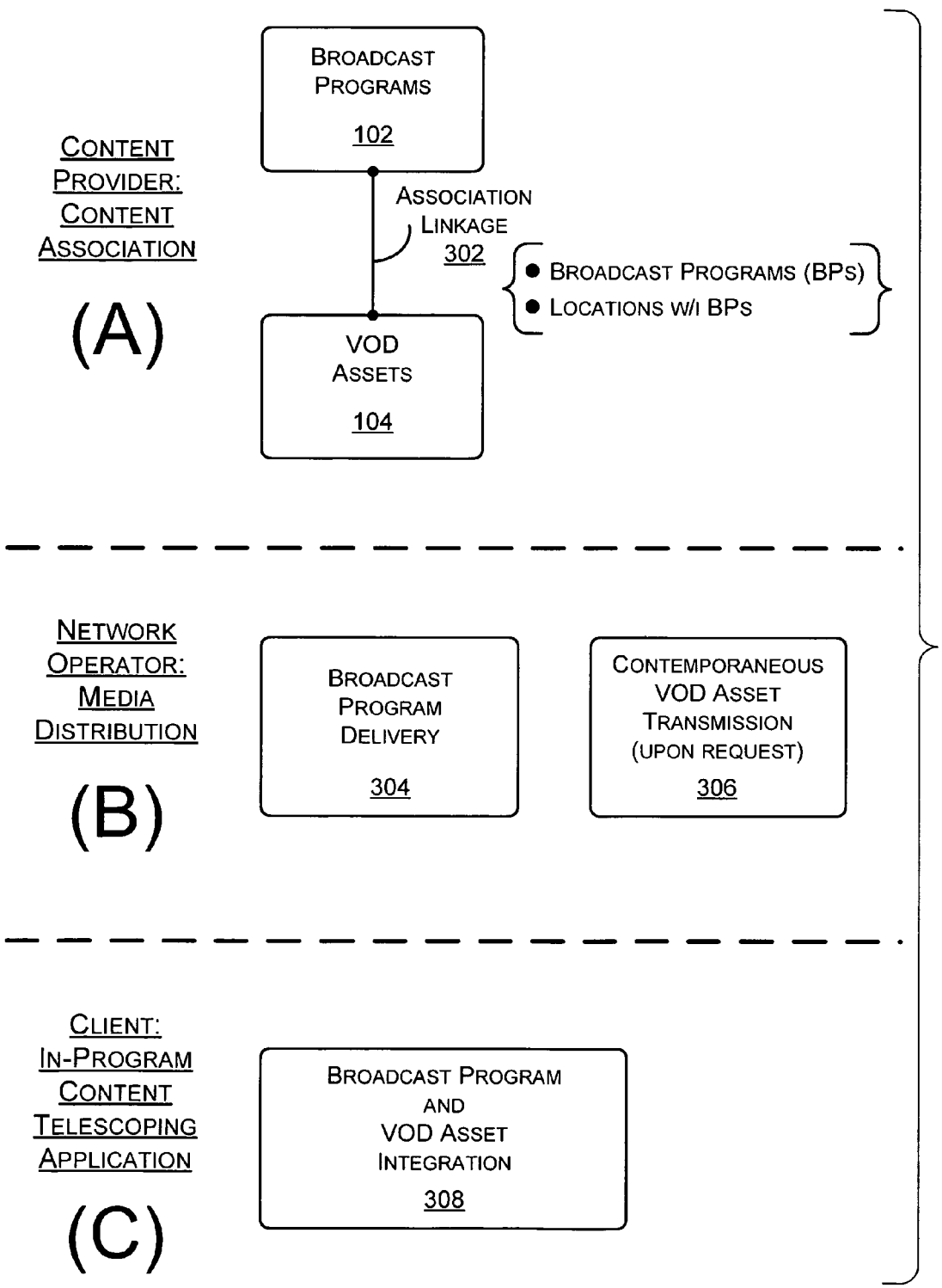
FIGS. 3A, 3B, and 3C are block diagrams illustrating example in-program content telescoping infrastructure and functionality for a content provider, a network operator, and a client, respectively.

FIGS. 3A, 3B, and 3C are block diagrams illustrating example in-program content telescoping infrastructure and functionality for a content provider, a network operator, and a client, respectively. FIG. 3A is directed to content association by a content provider 106 (of FIG. 1). The content association includes broadcast programs 102 and VOD assets 104. To create an association between the two different content types, an association linkage 302 between each VOD asset 104 and one or more broadcast programs 102 is created by a content provider 106.

Each VOD asset 104 may be of any given length, such as from a few seconds to several minutes to over an hour. The creation of association linkages 302 may be manual or automatic. They may be created automatically by, for example, matching terms in the CC streams of broadcast programs 102 to those in the CC streams of VOD assets 104. A database of CC records may be mined for this purpose.

In a described implementation, each association linkage 302 institutes a linkage to both a broadcast program (BP) 102 and at least one location within the associated broadcast program 102. Metadata for an association linkage 302 is described more fully herein below with particular reference to FIG. 7. Trigger information to be embedded in the media transport stream of a broadcast program 102 to indicate the presence of a trigger location is described further below with particular reference to FIG. 8.

FIG. 3B is directed to media distribution by a network operator 108. The media distribution includes broadcast program delivery 304 and contemporaneous VOD asset transmission 306. As part of the functionality and infrastructure of broadcast program delivery 304, network operator 108 is responsible for disseminating broadcast programs 102 at their scheduled times over a distribution system 110 via at least one network 112.

Additionally, upon request from a client 114, network operator 108 is responsible for contemporaneously transmitting VOD assets 104. In this context, the functionality and infrastructure of contemporaneous VOD asset transmission 306 includes the transmission of VOD asset representation indicators in prior to an indicated trigger location as well as the real-time VOD delivery of selected VOD assets 104.

FIG. 3C is directed to in-program content telescoping by an application at a client 114. Such an application includes functionality (and any requisite infrastructure) for broadcast program and VOD asset integration 308 at clients 114. For example, an application for broadcast program and VOD asset integration 308 may be capable of presenting a UI that displays the VOD asset representation indicators in addition to enabling a user to select a VOD asset corresponding to one of the indicators. Broadcast program and VOD asset integration 308, which may be realized as processor-executable instructions 210, may also be capable of analyzing a broadcast program media transport stream, recognizing and processing trigger information, requesting VOD asset representation indicators, recognizing trigger locations, and requesting a selected VOD asset 104 from network operator 108.

Figure 4:
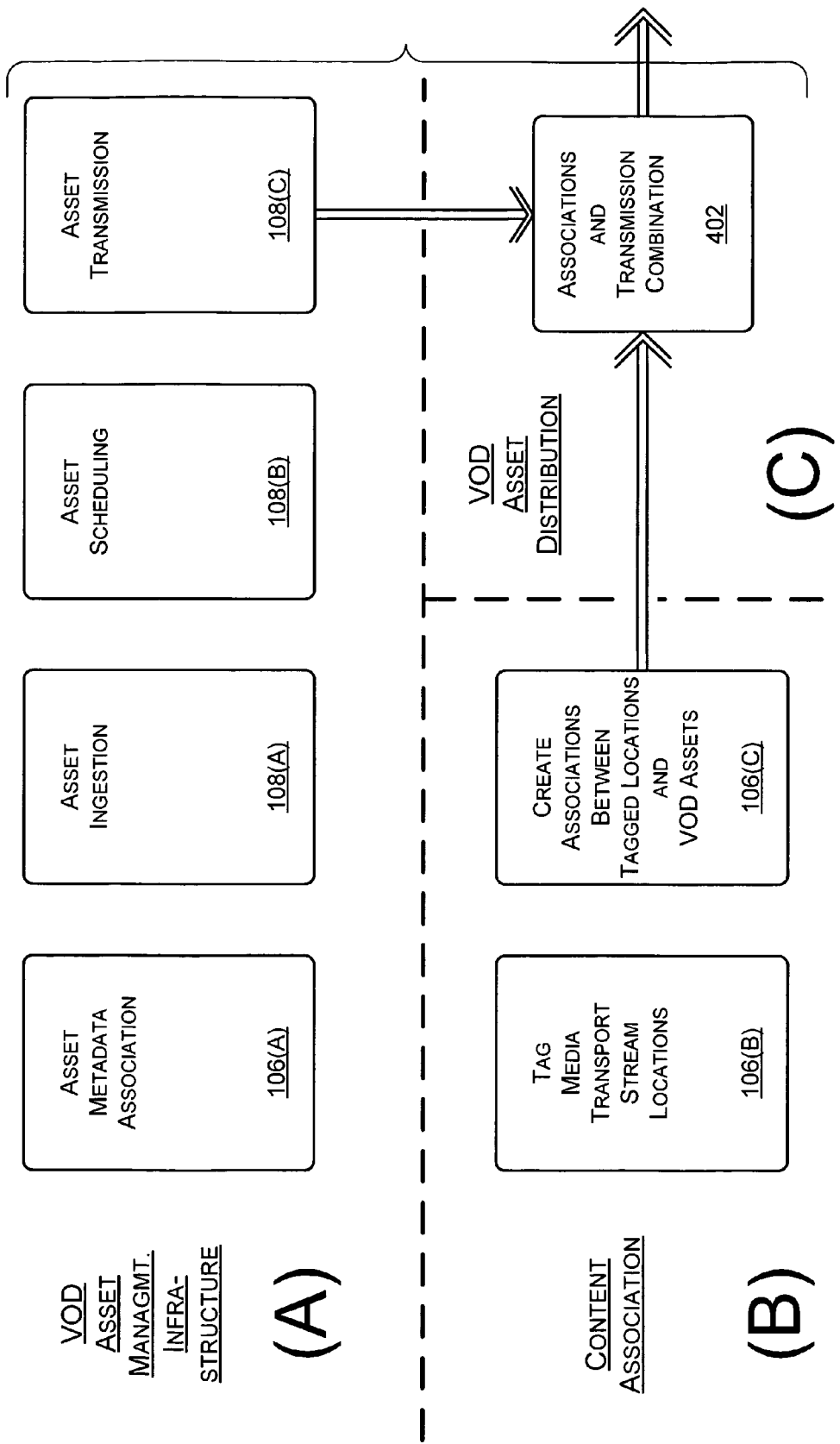
FIGS. 4A, 4B, and 4C are block diagrams illustrating example in-program content telescoping infrastructure and functionality for VOD asset management, content association, and VOD asset distribution, respectively.

FIGS. 4A, 4B, and 4C are block diagrams illustrating example in-program content telescoping infrastructure and functionality for VOD asset management, content association, and VOD asset distribution, respectively. In FIGS. 4A, 4B, and 4C, as well as FIGS. 5 and 6, blocks are numbered to indicate to which aspect of in-program content telescoping they are primarily associated. For example, asset metadata association 106(A) is primarily associated with content provider 106, and asset ingestion 108(A) is primarily associated with network operator 108.

FIG. 4A is directed to VOD asset management infrastructure. VOD asset management infrastructure includes asset metadata association 106(A), asset ingestion 108(A), asset scheduling 108(B), and asset transmission 108(C). Asset metadata association 106(A) is related to the production of asset metadata that associates VOD assets 104 with one or more broadcast programs 102. As described herein above, the association may be manual or automated. VOD asset metadata and the trigger information and trigger locations within broadcast programs 102 are described more fully herein below with particular reference to FIGS. 7 and 8, respectively.

Asset ingestion 108(A) relates to the process of incorporating VOD assets 104 that are received from content providers 106 into distribution system 110. For example, they may be stored at a head-end, at a centralized VOD system node, at forward-deployed VOD nodes, and so forth. Additionally, the received VOD assets 104 may be properly catalogued and indexed in accordance with received VOD asset metadata and the known scheduling for broadcast programs 102.

Asset scheduling 108(B) relates to ensuring that VOD assets 104 are available when associated broadcast programs 102 are disseminated. For example, if distribution system 110 includes downstream or forward-deployed VOD servers within network 112, asset scheduling 108(B) transmits to such VOD servers VOD assets 104 that are to become relevant based on the stored program guide. For instance, all VOD assets 104 that are to become relevant (e.g., possibly requested by clients 114) within the next upcoming seven days may be transmitted to the downstream VOD servers.

Asset scheduling 108(B) is also responsible for pruning VOD assets 104 from the overall infrastructure of network operator 108. For example, after all known broadcast programs 102 that are associated with a given VOD asset 104 have been disseminated, that given VOD asset 104 may be deleted from the system in order to save storage resources. In this manner, irrelevant VOD assets 104 can be pruned from the asset management infrastructure.

Asset transmission 108(C) relates to the timely, possibly real-time, transmission of VOD assets 104 to requesting clients 114. Asset transmission 108(C) is described more fully below with particular reference to FIG. 4C.

FIG. 4B is directed to content association. Content association includes two functionalities for content providers 106: tagging media transport stream locations 106(B) and creating associations between tagged locations and VOD assets 106 (C). With the functionality of tag media transport stream locations 106(B), the media transport streams of broadcast programs 102 are tagged with trigger information. The trigger information communicates to clients 114 the (upcoming) presence of a trigger location within the tagged media transport stream. A client 114, which has in-program content telescoping functionality active, is then responsible for displaying the appropriate UI upon arrival of the indicated trigger location.

With the functionality of create associations between tagged locations and VOD assets 106(C), metadata for VOD assets 104 are created to establish association linkages 302 (of FIG. 3) between individual VOD assets 104 and one or more broadcast programs 102. The tagged locations that have the trigger information include a portion of the VOD asset metadata that is sufficient to identify the VOD asset(s) 104 that are associated with the tagged locations. Example implementations for VOD asset metadata and embedded trigger information are described further herein below with particular reference to FIGS. 7 and 8, respectively.

FIG. 4C is directed to VOD asset distribution. VOD asset distribution includes the infrastructure and functionality of associations and transmission combination 402. Associations and transmission combination 402 is a nexus between the VOD asset management infrastructure of FIG. 4A and the content association of FIG. 4B. The tagged locations having the trigger information, the trigger locations, the created linkage associations, the VOD asset metadata, the VOD assets, and the broadcast programs are utilized in a combined and coordinated fashion by the network operator to ensure that the VOD asset distribution is effectuated in a manner that facilitates timely transmission of requested VOD assets to requesting clients.

Figure 5:
FIG. 5 is a block diagram illustrating example in-program content telescoping components and logic for a client device.

FIG. 5 is a block diagram illustrating example in-program content telescoping components and logic for a client device 114. These components may be realized as hardware, firmware, software (including as processor-executable instructions 210), some combination thereof, and so forth. As illustrated in FIG. 5, client 114 includes trigger detection 114(A), UI display 114(B), pause/play logic 114(C), and report issuance 114(D). In a described implementation, trigger detection 114(A) is responsible for detecting trigger information within a media transport stream of a received broadcast program 102. Upon such detection, client 114 requests VOD asset representation indicator(s) that are associated with the detected trigger information.

Upon receipt of the VOD asset representation indicators, UI display 114(B) creates or prepares an appropriate UI that includes the VOD asset representation indicators. When the trigger location indicated in the trigger information arrives along the media transport stream, the UI display 114(B) can present the prepared UI to the user without further delay. It also provides the user an ability to select one of the associated VOD assets 104 as represented on-screen by the displayed VOD asset representation indicators.

When a user selects a VOD asset representation indicator, pause/play logic 114(C) pauses the current broadcast program 102 and requests delivery of the VOD asset 104 that corresponds to the selected VOD asset representation indicator. When the requested VOD asset 104 is received, pause/play logic 114(C) plays the VOD asset 104. Upon completion or termination of the playing of the VOD asset 104, pause/play logic 114(C) begins playing the previously paused broadcast program 102.

Report issuance 114(D) is a component that is responsible for providing reports to network operator 108. Reports are issued with respect to viewings of VOD assets 104 in order to enable an accounting to be performed with content providers 106. For example, a report may be issued each time a VOD asset 104 is selected based on the displayed VOD asset representation indicator. The report may indicate whether the entirety of (and if not, to what extent) the selected VOD asset 104 was played by the user.

For instance, a user may terminate the playing of a five-minute VOD asset 104 at the one-minute mark. The report may indicate whether or not a commercial that is to precede or follow the selected VOD asset 104 was played. In either case, the remuneration between the content provider 106 and the network operator 108 may be dependent on the report. For example, content providers 106 may only be willing to pay when a user actually plays a full commercial or watches over half of a VOD asset 104.

Figure 6:
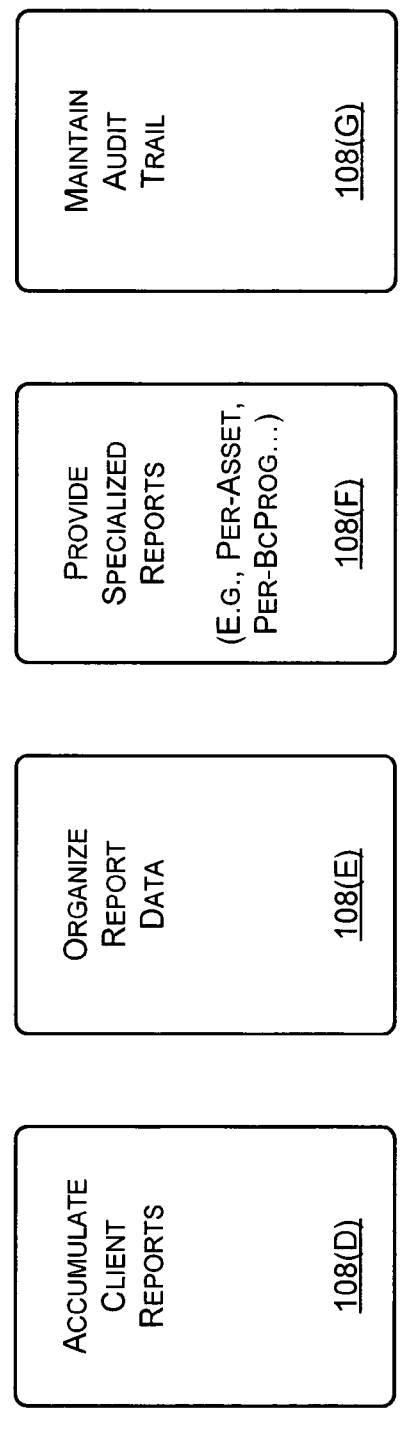
FIG. 6 is a block diagram illustrating example reporting infrastructure and functionality for a network operator providing in-program content telescoping.

FIG. 6 is a block diagram illustrating example reporting infrastructure and functionality for a network operator 108 providing in-program content telescoping. As illustrated, the reporting infrastructure and functionality includes the following: client report accumulation 108(D), report data organizer 108(E), specialized reports provisioning 108(F), and audit trail maintenance 108(G).

In a described implementation, client reports accumulator 108(D) is responsible for collecting the VOD asset playing reports generated at and sent from report issuer 114(D) of client 114. Report data organizer 108(E) is adapted to organize the playing reports received from clients 114. The reports may be organized (e.g., ranked, grouped, listed, etc.) by content provider 106, by date/time of playing, by network, by channel, by VOD asset 104, by percentage or portion of the VOD asset 104 that is played, by broadcast program 102, some combination thereof, and so forth.

After (or before) organization, specialized report provider 108(F) is capable of providing specialized reports based on the received and accumulated client playing reports. Examples of specialized reports include per-VOD asset reports, per-broadcast program reports, and other specialized reports derivable from the organizational categories described above with respect to report data organization 108(E).

Audit trail maintainer 108(G) is responsible for maintaining records of the received client reports and the functioning of the in-program content telescoping subsystem of distribution system 110. The records of the audit trail can be used to identify, diagnose, track, etc. problems and errors with the in-program content telescoping subsystem, especially accounting portions thereof. The records can also be used to respond to inquiries from and provide verification to content providers 106 regarding which VOD assets 104 have actually been played and by whom.

EXAMPLE METADATA AND TRIGGER INFORMATION FOR IN-PROGRAM CONTENT TELESCOPING

Figure 7:
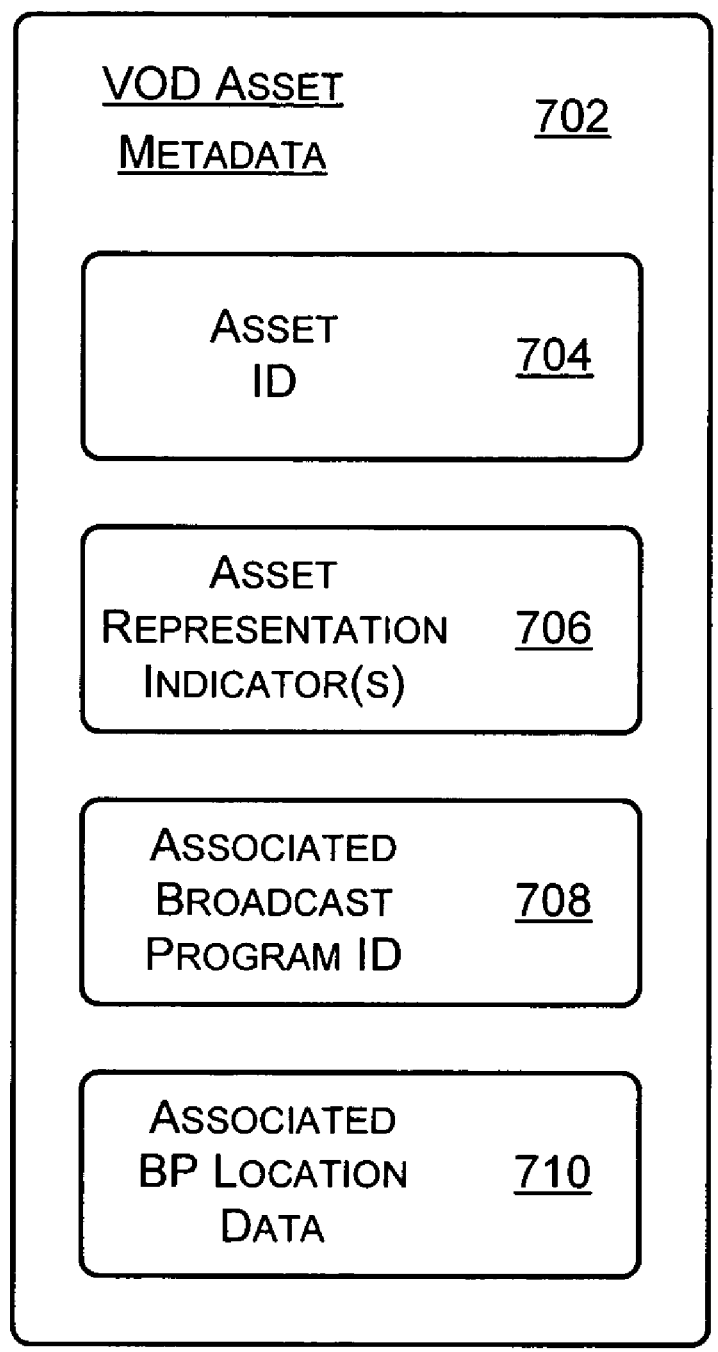
FIG. 7 is a block diagram illustrating an example of VOD asset metadata.

FIG. 7 is a block diagram illustrating an example of VOD asset metadata 702. As illustrated, VOD asset metadata 702 includes an asset ID 704, asset representation indicator(s) 706, associated broadcast program ID 708, and associated broadcast program location data 710.

In a described implementation, asset ID 704 is an identifier of the corresponding VOD asset 104. It may be, for example, globally or locally unique with respect to all other items of information, with respect to media content, with respect to other VOD asset metadata 702, and so forth.

Asset representation indicator(s) 706 comprises at least one VOD asset representation indicator. Each VOD asset 104 may have, for example, one representation indicator, multiple representation indicators, one representation indicator for multiple indicator types, and so forth. Indicator types include, for example, prompts, images, some combination thereof, and so forth. Prompts may comprise text, icons, and so forth. Images may comprise stills (e.g., a JPEG), relatively short clips (e.g., repeating loops of 5-15 seconds for an MPEG), and so forth.

Associated broadcast program ID 708 comprises the identifier of the broadcast program or programs 102 to which the corresponding VOD asset 104 is associated. Associated BP location data 710 indicates the trigger location along the broadcast program media transport stream. When the trigger location is reached, client 114 displays asset representation indicator(s) 706 for at least one VOD asset 104 and makes it (or them) available for user selection. Associated BP location data 710 may be, for example, a specified random access point (RAP) of the associated broadcast program 102, a list or set of keywords that are present in the CC data stream portion of the associated broadcast program 102, and so forth. By way of example only, a RAP may be a frame that is capable of being decoded and displayed without reference to any other frame. Although not shown in FIG. 7, VOD asset metadata 702 may also include the location along the associated broadcast program 102 at which the trigger location is embedded.

Figure 8:
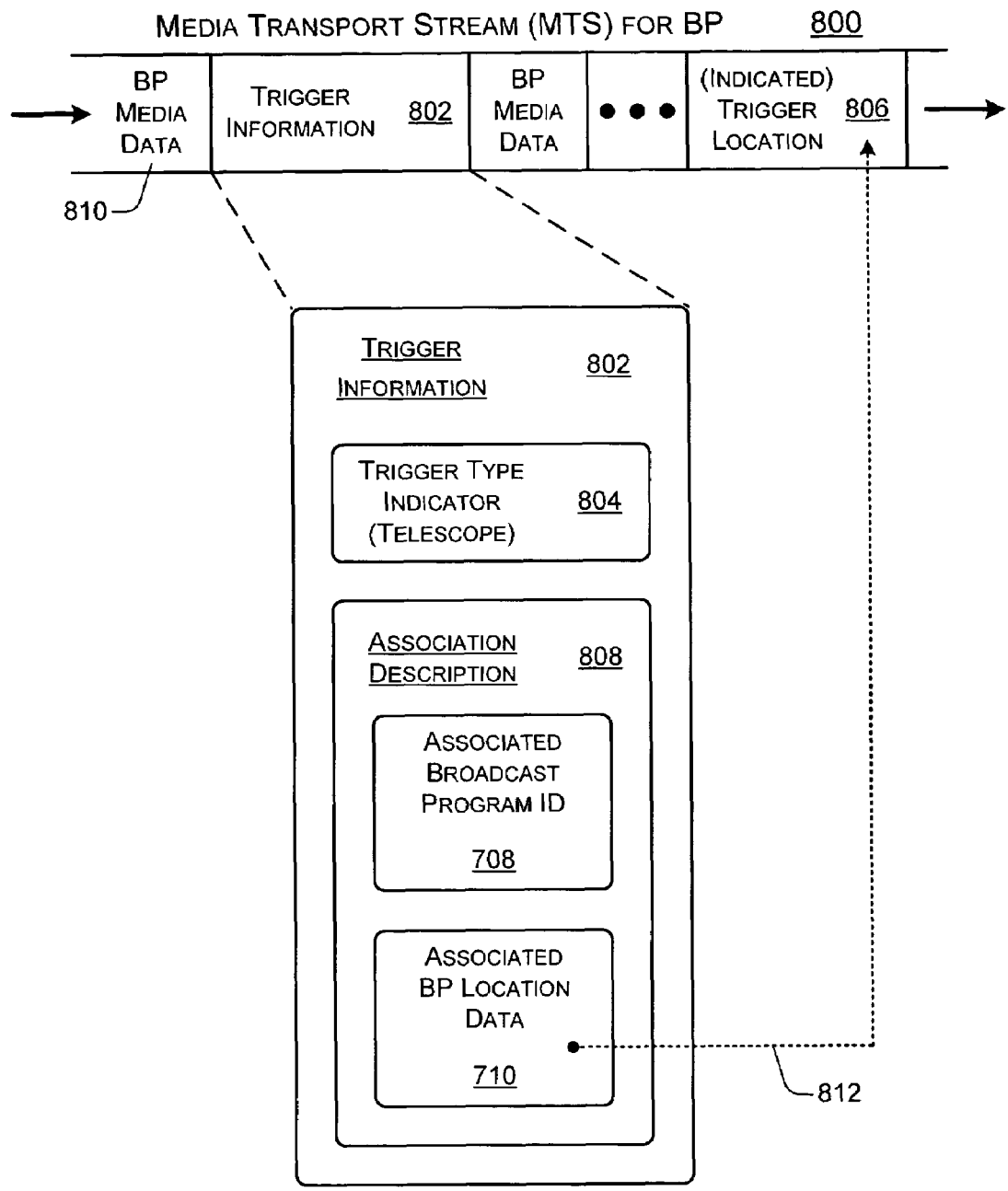
FIG. 8 is a block diagram illustrating an example media transport stream (MTS) for a broadcast program (BP) along with an example of content telescoping trigger information metadata that is embedded in the MTS.

FIG. 8 is a block diagram illustrating an example media transport stream (MTS) 800 for a broadcast program (BP) along with an example of content telescoping trigger information 802 metadata that is embedded in media transport stream 800. As illustrated, media transport stream 800 includes broadcast program media data 810, trigger information 802, and trigger location 806.

In a described implementation, broadcast program media data 810 comprises the data that can be decoded to produce the video of the broadcast program. Trigger information 802 includes information that enables a client 114 to begin processing an upcoming in-program content telescoping event. The indicated trigger location 806 is the location along media transport stream 800 at which the appropriate UI is to be displayed.

Trigger information 802 includes a trigger type indicator 804 and an association description 808. Trigger type indicator 804 indicates that, from among the possible trigger types, the trigger information 802 pertains to a content telescoping type trigger event. Although not so illustrated in FIG. 8, trigger information 802 may alternatively be located in a separate trigger information metadata document instead of being embedded in media transport stream 800. Such a separate trigger information metadata document may include multiple trigger tags or points and may be referenced by client 114 while decoding media transport stream 800.

Generally, association description 808 includes information that can be utilized to collect the one or more VOD asset representation indicators for the VOD assets 104 that are associated with the broadcast program 102 of media transport stream 800. Specifically, association description 808 includes at least one associated broadcast program identification 708 and associated broadcast program location data 710, which can both also be part of VOD asset metadata 702 (as shown in FIG. 7).

Because more than one VOD asset metadata 702 can have the same associated broadcast program ID 708 and the same associated broadcast program location data 710, association description 808 can effectively associate multiple VOD assets 104 to one incidence of trigger information 802 of media transport stream 800. Utilization of association description 808 with regard to collecting associated VOD assets 104 (and the asset representation indicator(s) 706 thereof) is described more fully herein below with particular reference to FIGS. 10 and 11.

Associated BP location data 710 effectively references the indicated trigger location 806 within media transport stream 800. The reference is illustrated as pointer arrow 812 in FIG. 8. Associated BP location data 710 is described further herein above with particular reference to FIG. 7. In accordance with the examples provided above, associated BP location data 710 may be an absolute value along media transport stream 800, an offset from the location of trigger information 802, etc., as well as possibly CC terms or a CC phrase.

EXAMPLE USER INTERFACE FOR
IN-PROGRAM CONTENT TELESCOPING

Figure 9:
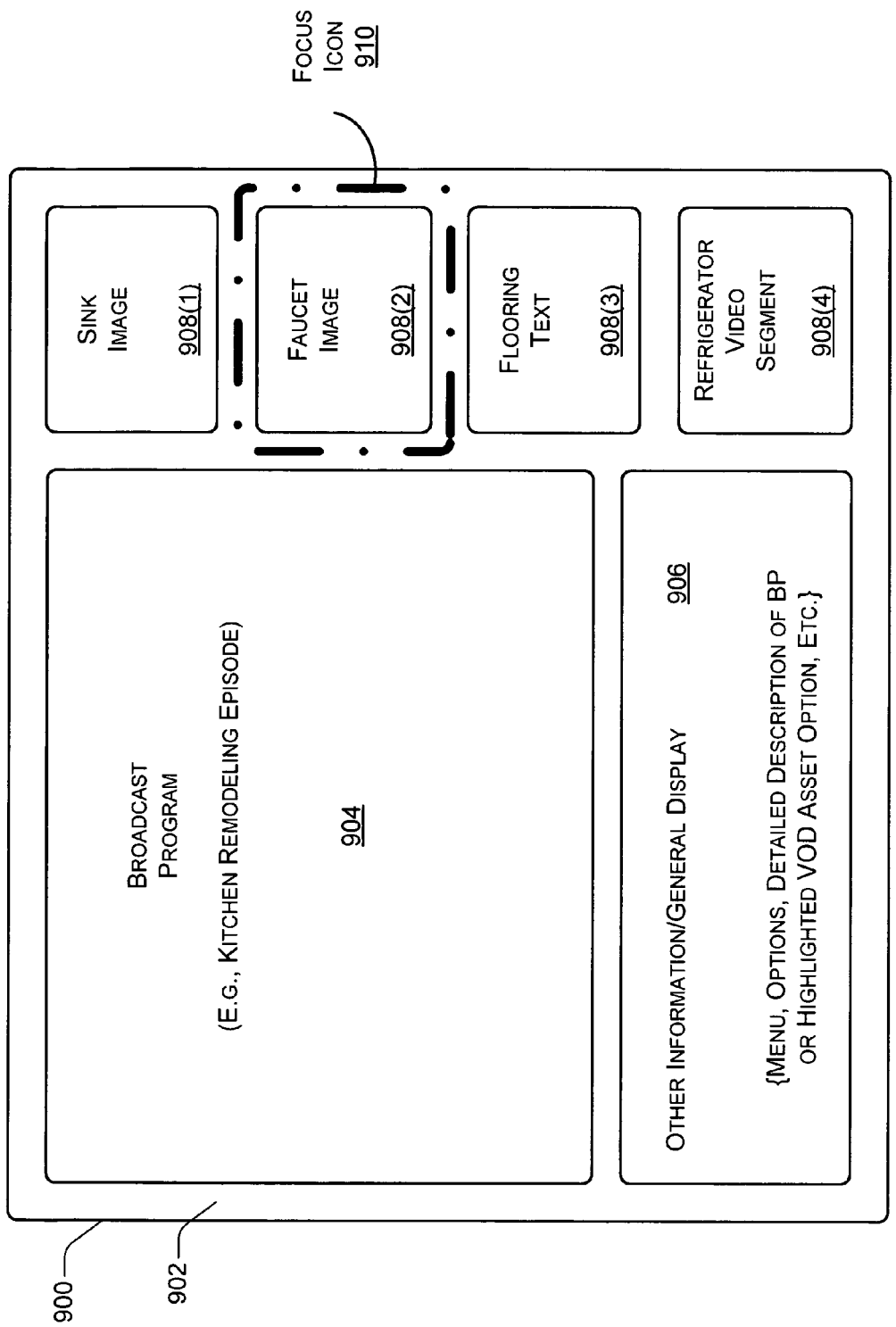
FIG. 9 is a block diagram of a screen displaying an example of an in-program content telescoping user interface (UI).

FIG. 9 is a block diagram of a screen 900 displaying an example of an in-program content telescoping user interface (UI) 902. Although a UI for in-program content telescoping may be implemented in many different manners, the illustrated UI 902 divides screen 900 into different areas. Alternative approaches include, but are not limited to, pure picture-in-picture (e.g., without borders and other UI aesthetics), the aforementioned textual or iconic prompts, and so forth. By way of example only, the primary broadcast program being viewed may avoid being reduced in size if some of the area is overlaid (possibly with partial transparency) with VOD asset representation indicators.

As illustrated, in-program content telescoping UI 902 includes three major areas: a broadcast program area 904, an other information/general display area 906, and a VOD asset representation indicators area 908. Broadcast program area 904 displays the primary broadcast program being viewed by the subscriber. In the example given, a kitchen remodeling episode is being displayed.

The other information/general display area 906 is an optional area that may include menu related items, in-program content telescoping options, a detailed description of the broadcast program being viewed, a detailed description of the VOD asset whose VOD asset representation indicator is currently being highlighted, some combination thereof, and so forth.

VOD asset representation indicator area 908 includes four different indicators 908(1)-908(4). However, any number of indicators may alternatively be displayed. Each VOD asset representation indicator 908 is the visual display realization of the data held by a respective VOD asset representation indicator 706 of VOD asset metadata 702.

Focus icon 910 can be used to highlight and/or select a particular one of the four VOD asset representation indicators 908 in order to activate the playing of the corresponding selected VOD asset 104. Although shown as a ring, focus icon 910 may be formed as another shape, may be represented on screen with backlighting, may be represented on screen by a change to text describing a VOD asset representation indicator 908, may be represented on screen by a change to a shape of a VOD asset representation indicator 908, may be represented on screen by animation, and so forth.

As illustrated, there is a sink image 908(1), a faucet image 908(2), flooring text 908(3), and a looping refrigerator video segment 908(4). These VOD asset representation indicators 908 may correspond, for example, to expanded clips from the current broadcast program, to related clips from past broadcast programs, to related commercials, and so forth. The UI may also provide the subscriber an opportunity to select from multiple such related possibilities per a given VOD asset representation indicator 908 by listing or displaying them in other information/general display area 906 when focus icon 910 is highlighting a given VOD asset representation indicator 908.

EXAMPLE METHODS FOR IN-PROGRAM
CONTENT TELESCOPING

Figure 10:
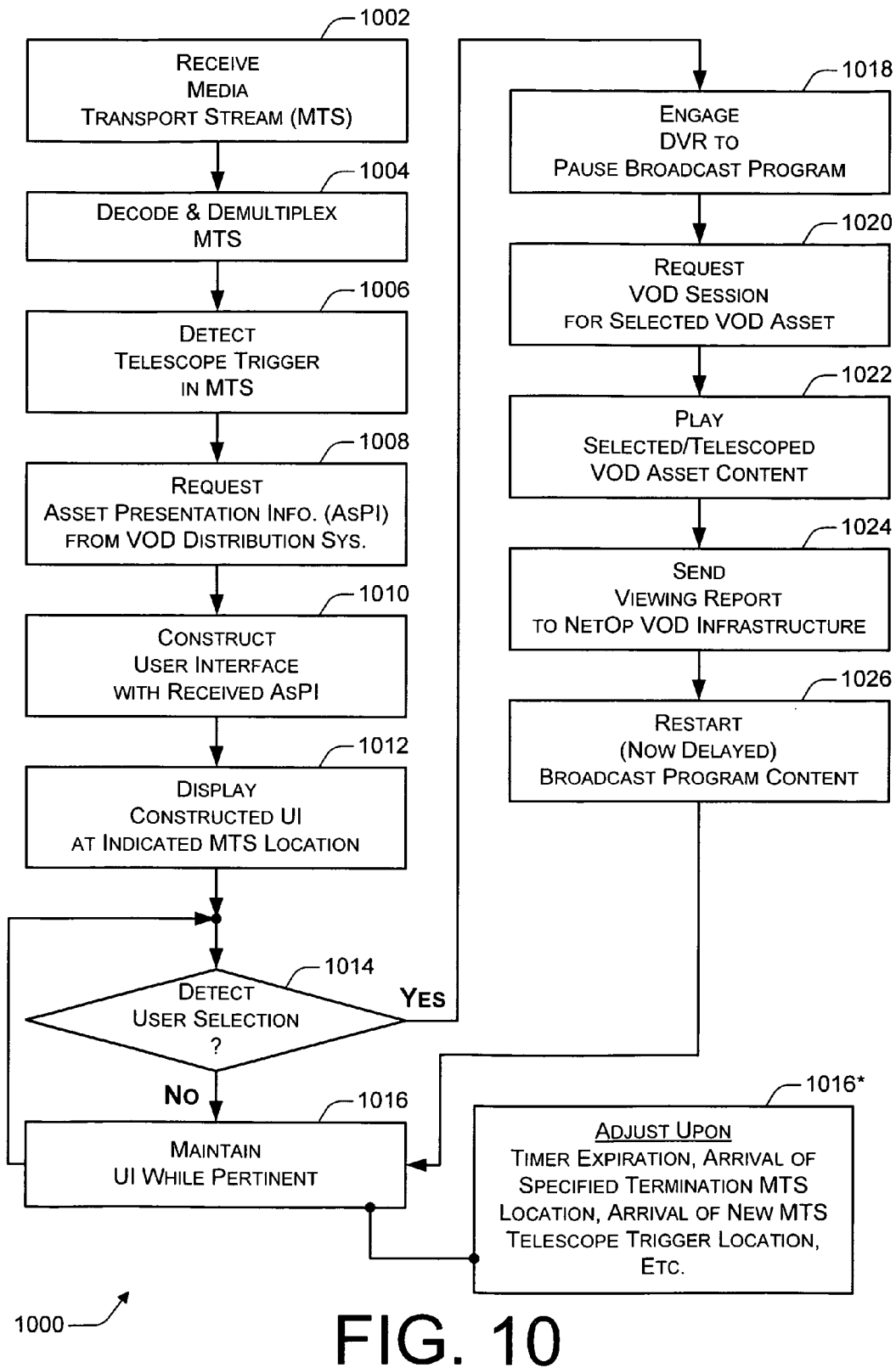
FIG. 10 is a flow diagram that illustrates an example of a method for in-program content telescoping from the perspective of a client device.

FIG. 10 is a flow diagram 1000 that illustrates an example of a method for in-program content telescoping from the perspective of a client device. Flow diagram 1000 includes fourteen (14) blocks 1002-1026 (plus block 1016*). Although the actions of flow diagram 1000 may be performed in other environments and with a variety of hardware and software combinations, a client device 114 (of FIGS. 1 and 5 especially) and FIGS. 1-9 (in general) are used in particular to illustrate certain aspects and examples of the method.

At block 1002, a media transport stream (MTS) is received. For example, client 114 may receive a media transport stream 800 from a network operator 108. At block 1004, the media transport stream is decoded and de-multiplexed. For example, client 114 may decode and de-multiplex broadcast program media data 810 along with any trigger information 802 that is present within the received media transport stream 800.

At block 1006, a telescope trigger is detected within the media transport stream. For example, trigger detector 114(A)

of client 114 may detect trigger information 802 having a content telescoping trigger type indicator 804.

At block 1008, asset presentation information (AsPI) is requested from the VOD distribution system. For example, client 114 may send a request for asset presentation information to a VOD subsystem of network operator 108. The request may include association description 808.

At block 1010, a user interface is constructed with the received asset presentation information. For example, UI display component 114(B) of client 114 may construct a UI 902 with the received asset presentation information. By way of example only, the asset presentation information may include VOD asset metadata 702 for one or more and up to all VOD assets 104 that are relevant to the provided association description 808. Alternatively, the asset presentation information may comprise at least VOD asset representation indicator(s) 706.

At block 1012, the constructed UI is displayed at the indicated location of the media transport stream. For example, UI display component 114(B) may display the constructed UI 902, having VOD asset representation indicators 908, when media transport stream 800 reaches the indicated trigger location 806.

At block 1014, it is detected if the user selects a displayed VOD asset representation indicator. For example, UI display component 114(B) may detect if a user navigates a focus icon 910 to a particular VOD asset representation indicator 908 to highlight and then select the corresponding VOD asset 104.

If no user selection is detected (at block 1014), then at block 1016 the UI is maintained while it is pertinent. As indicated by block 1016*, a current UI may cease to be pertinent, and may therefore be adjusted in a number of situations. The adjustment may be, for example, by way of modification, removal, replacement, some combination thereof, and so forth. The UI adjustment may occur upon, for example, a timer expiration, arrival of a specified termination location within the media transport stream, arrival of a new media transport stream trigger location, user cancellation, and so forth.

If, on the other hand, a user selection is detected (at block 1014), then at block 1018 a digital video recorder is engaged to pause the broadcast program. For example, pause/play logic 114(C) of client 114 may pause the "live" broadcast program 102 with a DVR component of client 114.

At block 1020, a VOD session is requested for the selected VOD asset. For example, a VOD session may be requested for the VOD asset 104 corresponding to the selected VOD asset representation indicator 908. At block 1022, the selected VOD asset content that is being telescoped is played. For example, the selected VOD asset 104 may be played full-screen or within a "main broadcast program" content window area 904.

After completion or termination of the playing of the selected VOD asset, at block 1024 a viewing report is sent to the network operator's VOD infrastructure. For example, report issuer 114(D) may send a viewing report covering at least the selected VOD asset 104. The viewing report, in addition to identifying the VOD asset 104, may identify the subscriber (and/or subscriber demographical information), may specify how much of the VOD asset 104 was played, and so forth.

At block 1026, the now delayed broadcast program content is restarted. For example, pause/play logic 114(C) of client 114 may restart the paused broadcast program content 102. Especially if the UI 902 is still being displayed, flow diagram 1000 then continues at block 1016. Client 114 may also be continually monitoring the incoming media transport stream 800 to detect another telescope trigger therein (at block 1006).

Figure 11:
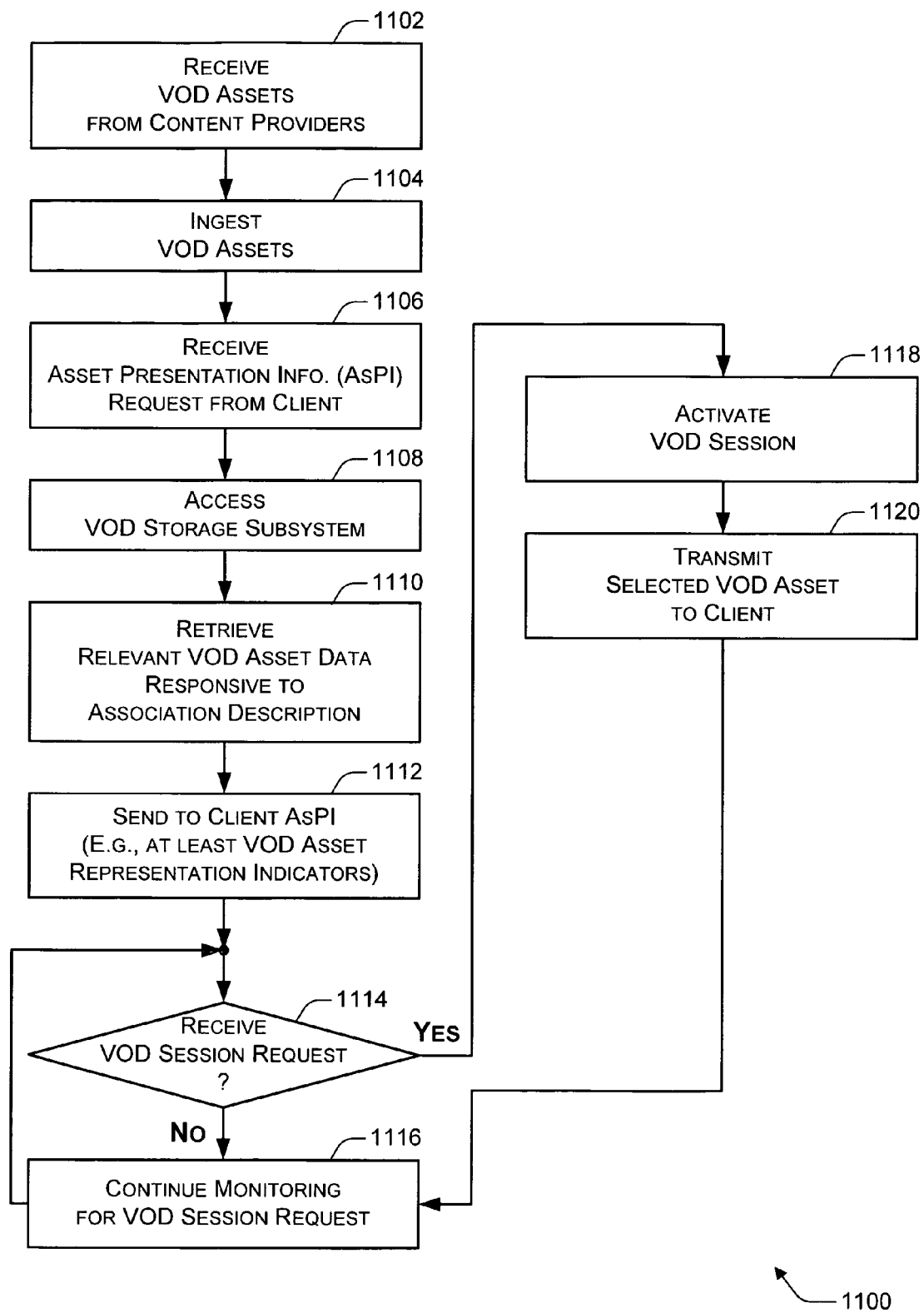
FIG. 11 is a flow diagram that illustrates an example of a method for in-program content telescoping from the perspective of network provider infrastructure.

FIG. 11 is a flow diagram 1100 that illustrates an example of a method for in-program content telescoping from the perspective of network provider infrastructure. Flow diagram 1100 includes ten (10) blocks 1102-1120. Although the actions of flow diagram 1100 may be performed in other environments and with a variety of hardware and software combinations, network operator 108 and FIGS. 1-9 are used in particular to illustrate certain aspects and examples of the method.

At block 1102, VOD assets are received from content providers. For example, network operator 108 may receive VOD assets 104 from content providers 106. At block 1104, the received VOD assets are ingested. For example, asset ingestion infrastructure and functionality 108(A) of network operator 108 may ingest the received VOD assets 104 by processing, organizing, and storing them to facilitate subsequent rapid transmission on-request.

At block 1106, a request for asset presentation information (AsPI) is received from a client. For example, network operator 108 may receive an association description 808 from a client 114 that relates to an in-program content telescoping event and requests asset presentation information.

At block 1108, a VOD asset storage subsystem is accessed. For example, network operator 108 may access a storage subsystem that holds VOD assets 104. The accessing may entail a search to identify relevant VOD assets 104 that match the received association description 808. For instance, the received association description 808 may be compared to VOD asset metadata 702 until both a matching associated broadcast program ID 708 and a matching associated broadcast program location data 710 are ascertained for one or more VOD assets 104.

At block 1110, the relevant matching VOD asset data are retrieved responsive to the association description. For example, VOD asset metadata 702 having the associated broadcast program ID 708 and the associated broadcast program location data 710 that match the received association description 808 may be retrieved.

At block 1112, the requested asset presentation information is sent to the client. For example, at least asset representation indicator(s) 706, if not the entirety of the VOD asset metadata 702, are sent from network operator 108 to the requesting client 114. For the client 114 to subsequently request a VOD session for a given VOD asset 104, the client 114 does first receive the asset ID 704 of the given VOD asset 104 that is to be requested. For such circumstances, VOD asset metadata 702 for each matching VOD asset 104 may be sent as the asset presentation information.

At block 1114, it is determined if a VOD session request is received. For example, a VOD session request that includes an asset ID 704 corresponding to a selected VOD asset 104 may be received from a client 114.

If a VOD session request is not determined to be received (at block 1114), then at block 1116 monitoring is continued to determine if a VOD session is requested. If, on the other hand, a VOD session request is received (as determined at block 1114), then at block 1118 a VOD session is activated. For example, a VOD subsystem of network operator 108 that is part of distribution system 110 may be employed to provide a VOD session.

At block 1120, the selected VOD asset is transmitted to the client. For example, the VOD asset 104 corresponding to the received asset ID 704 may be transmitted to client 114 in real-time for the activated VOD session. Flow diagram 1100 may then continue at block 1116 with additional monitoring for VOD session requests. Network operator 108 may also be continually monitoring messages from clients 114 to determine if another in-program content telescoping event is to occur in response to receiving another request for asset presentation information (at block 1106).

The devices, actions, aspects, features, functions, procedures, modules, data structures, components, etc. of FIGS. 1-11 are illustrated in diagrams that are divided into multiple blocks. However, the order, interconnections, interrelationships, layout, etc. in which FIGS. 1-11 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, ect. for in-program content telescoping.

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A method comprising:
    providing trigger information to a network operator device and by a client device, the trigger information including:
        a trigger type indicator that indicates the trigger information is related to a content telescoping event; and
        an association description that describes an association between a broadcast program and at least one video-on-demand (VOD) asset, wherein the association description comprises location data that references an indicated trigger location within a media transport stream of the broadcast program;
    detecting, by the client device, a content telescoping trigger in the media transport stream of the broadcast program, wherein the content telescoping trigger comprises information that describes an association between at least one video-on-demand (VOD) asset and a particular portion of the broadcast program, and wherein display of the at least one VOD asset at the particular portion of the broadcast program provides additional information related to the particular portion of the broadcast program;
    receiving, by the client device and from the network operator device, at least one VOD asset representation indicator associated with the at least one VOD asset, and
    displaying, by the client device, the at least one VOD asset representation indicator at the particular portion of the broadcast program and that corresponds to the content telescoping trigger.

2. The method as recited in claim 1,
    wherein the method further comprises:
    sending to a network operator, responsive to detection of the content telescoping trigger, the information that describes the association between the at least one VOD asset and the particular portion of the broadcast program, wherein the sending is part of a request for VOD asset presentation information.

3. The method as recited in claim 2, further comprising:
    receiving VOD asset metadata from the network operator in response to the sending, the VOD asset metadata including the at least one VOD asset representation indicator.

4. The method as recited in claim 3, wherein the VOD asset metadata further includes an identifier of the at least one VOD asset, an identification of the associated broadcast program, and location data for a trigger location within the media transport stream of the associated broadcast program.

5. The method as recited in claim 1, wherein the content telescoping trigger indicates a trigger location along the media transport stream; and
    wherein the at least one VOD asset representation indicator is displayed upon arrival of the trigger location along the media transport stream.

6. The method as recited in claim 1, wherein the displaying comprises at least one of:
    displaying at least one prompt that indicates the existence of telescoped content; or
    displaying at least one image that indicates the existence of telescoped content.

7. The method as recited in claim 1, further comprising:
    detecting user selection of the VOD asset representation indicator; and
    playing a selected VOD asset corresponding to the selected VOD asset representation indicator.

8. The method as recited in claim 7, further comprising:
    pausing a playing of the broadcast program;
    establishing a VOD session for the selected VOD asset; and
    upon completion or termination of the playing of the selected VOD asset, continuing the playing of the broadcast program.

9. The method as recited in claim 7, further comprising:
    sending a VOD asset playing report to a network operator, the VOD asset playing report indicating how long the selected VOD asset corresponding to the selected VOD asset representation indicator was played by a subscriber.

10. One or more processor-accessible media comprising processor-executable instructions that include a media transport stream, the media transport stream comprising:
    broadcast program media data, the broadcast program media data capable of being decoded by one or more client processors into video frames of a broadcast program; and
    trigger information, the trigger information including:
        a trigger type indicator that indicates the trigger information is related to a content telescoping event; and
        an association description that describes an association between the broadcast program and at least one video-on-demand (VOD) asset, wherein the association description comprises location data that references an indicated trigger location within the media transport stream of the broadcast program, and wherein the indicated trigger location is identified based on detection of one or more closed captioning keywords;
    wherein the processor-executable instructions further include VOD asset metadata, the VOD asset metadata further comprising:
        an identifier of a VOD asset that corresponds to the VOD asset metadata,
        at least one asset representation indicator that comprises a prompt or image that can represent the VOD asset to a subscriber,
        identification of the associated broadcast program, and
        location data that references a trigger location within the media transport stream of the broadcast program; and
    wherein the processor-executable instructions, when executed by at least one processor, direct a network operator device to perform actions comprising:
        receiving the association description from a client device, determining that the association description matches the identification of the associated broadcast program and the location data, sending the at least one asset representation indicator to the client device responsive to the determining, receiving a VOD session request from the client device that includes the identifier of the VOD asset that corresponds to the VOD asset metadata, activating a VOD session, and transmitting the VOD asset to the client device in the activated VOD session.

11. The one or more processor-accessible media as recited in claim 10, wherein the association description further comprises identification of the associated broadcast program.

12. The one or more processor-accessible media as recited in claim 10, wherein the processor-executable instructions, when executed by the one or more processors, direct a client device to perform actions comprising:

detecting the trigger information in the media transport stream;

sending the association description to a network operator; and receiving VOD asset metadata from the network operator, the VOD asset metadata matching the association description and including at least one asset representation indicator corresponding to the at least one VOD asset.

13. A method comprising:

receiving an asset presentation information request from a client, responsive to trigger information detected by the client in a media transport stream of a broadcast program, the trigger information including:

a trigger type indicator that indicates that the trigger information is related to a content telescoping event; and an association description that describes an association between the broadcast program and at least one video-on-demand (VOD) asset, wherein the association description comprises location data that references an indicated trigger location within the media transport stream of the broadcast program;

wherein the asset presentation information request includes the association description that describes an association between a particular portion of a broadcast program and the at least one video-on-demand (VOD) asset, wherein the at least one VOD asset comprises a clip taken from other existing content which relates to the particular portion of the broadcast program;

retrieving relevant VOD asset data responsive to the association description, the relevant VOD asset data including one or more VOD asset representation indicators corresponding to the at least one VOD asset; and sending the relevant VOD asset data to the client.

14. The method as recited in claim 13, further comprising:

receiving a VOD session request for the at least one VOD asset from the client;

activating a VOD session to send the at least one VOD asset to the client; and transmitting the at least one VOD asset to the client in real-time.

15. The method as recited in claim 13, wherein the relevant VOD asset data further includes an identifier of the corresponding at least one VOD asset, an identification of the associated broadcast program, and location data within a media transport stream of the associated broadcast program.

16. The method as recited in claim 13, further comprising:

receiving multiple VOD asset playing reports from multiple clients, each VOD asset playing report including information regarding a playing of at least one VOD asset;

organizing the information from the multiple VOD asset playing reports; and providing to one or more content providers specialized VOD asset playing reports based on the organized information.

\* \* \* \* \*